(12) United States Patent
Wang et al.

(10) Patent No.: US 9,894,001 B2
(45) Date of Patent: Feb. 13, 2018

(54) I/O CIRCUIT AND DATA TRANSMISSION CONTROL METHOD

(71) Applicant: VIA Alliance Semiconductor Co., Ltd., Shanghai (CN)

(72) Inventors: Wei-Lin Wang, Shanghai (CN); Peng Shen, Shanghai (CN); Jiin Lai, Taipei (TW); Ziyang Li, Shanghai (CN); Xiaoliang Kang, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 149 days.

(21) Appl. No.: 14/967,809

(22) Filed: Dec. 14, 2015

(65) Prior Publication Data
US 2017/0163543 A1 Jun. 8, 2017

(30) Foreign Application Priority Data

Dec. 4, 2015 (CN) .......................... 2015 1 0890645

(51) Int. Cl.
*H04L 12/66* (2006.01)
*H04L 12/819* (2013.01)
(Continued)

(52) U.S. Cl.
CPC .......... *H04L 47/215* (2013.01); *H04L 45/745* (2013.01); *H04L 49/9005* (2013.01)

(58) Field of Classification Search
CPC combination set(s) only.
See application file for complete search history.

(56) References Cited

U.S. PATENT DOCUMENTS 6,724,766 B2 * 4/2004 Michiel ................. H04L 47/522
370/412
6,735,679 B1 * 5/2004 Herbst .................... H04L 47/50
711/167
(Continued)

FOREIGN PATENT DOCUMENTS

CN 101470678 7/2009

OTHER PUBLICATIONS

Chinese language office action dated Oct. 14, 2016, issued in application No. TW 104141874.

*Primary Examiner* — Frank Duong
(74) *Attorney, Agent, or Firm* — McClure, Qualey & Rodack, LLP

(57) ABSTRACT

An I/O circuit includes buffers, a storage module, accumulators, timers, and an arbiter. Each buffer corresponds to a respective virtual channel. Each buffer corresponds to a respective token bucket, and outputs a normal transmission request according to the amount of tokens and an accumulating signal. The storage module stores a lookup table including a plurality of weightings. Each accumulator corresponds to a respective buffer, accumulates a data volume according to the corresponding weighting, and outputs the accumulating signal. Each timer corresponds to a respective buffer, times waiting period after the corresponding buffer outputs the normal transmission request, and outputs a time-out transmission request when the waiting period exceeds a predetermined period. The arbiter receives the time-out transmission requests and the normal transmission requests, and selects one of the buffers from all of the time-out transmission requests and the normal transmission requests.

14 Claims, 2 Drawing Sheets

(51) Int. Cl.
*H04L 12/741* (2013.01)
*H04L 12/861* (2013.01)

(56) References Cited

U.S. PATENT DOCUMENTS

| | | | |
|---|---|---|---|
| 6,963,576 | B1 | 11/2005 | Lee |
| 6,996,684 | B2 * | 2/2006 | Tseng .................. G06F 13/4004 710/240 |
| 7,224,671 | B2 * | 5/2007 | Lee ......................... H04L 47/10 370/235 |
| 7,779,187 | B2 * | 8/2010 | Ikeda .................... G06F 13/385 710/111 |
| 8,289,989 | B1 * | 10/2012 | Gibson ......................... 370/462 |

* cited by examiner

I/O CIRCUIT AND DATA TRANSMISSION CONTROL METHOD

CROSS REFERENCE TO RELATED APPLICATIONS

This Application claims priority of China Patent Application No. 201510890645.1, filed on Dec. 4, 2015, the entirety of which is incorporated by reference herein.

BACKGROUND OF THE INVENTION

Field of the Invention

The application relates in general to an I/O circuit and a data transmission control method, and in particular to an I/O circuit and a data transmission control method for determining transmission priority of the buffers according to the corresponding weighting of the data packet, the size of the data packet, and the wait time of each buffer.

Description of the Related Art

Thanks to technological advancements, the complexity of computer systems has increased. Given this situation, the processing efficiency of a computer system is more closely linked to the transmission speed and the transmission efficiency of data packets. In general, when the data packets of a plurality of channels are transmitted, the most common method is to gather the data packets and then transmit the data packets via an arbiter. For example, when the arbiter receives a normal transmission request corresponding to a data packet, a transmission priority is alternatively offered to each buffer. That means that each buffer can fairly obtain a chance of transmitting the data packet. However, even though the arbitration can fairly offer a chance to each buffer, one disadvantage is that the arbitration lacks flexibility, and this might reduce the efficiency of the data transmission. Furthermore, the arbitration described above does not consider the size of the data packets. When the size difference of the data packets is great, it is unfair for buffers which have smaller data packets. Thus, how to efficiently and fairly offer transmission priority to buffers is a problem which needs to be solved immediately.

BRIEF SUMMARY OF INVENTION

An embodiment of the present invention provides an I/O circuit, adapted to a computer system, that includes a plurality of buffers, a storage module, a plurality of accumulators, a plurality of timers, and an arbiter. Each buffer corresponds to one from among a plurality of virtual channels, respectively has a token bucket, and outputs a normal transmission request according to an amount of tokens in the token bucket and an accumulating signal. The storage module stores a lookup table. Each accumulator corresponds to one from among the plurality of buffers. Each accumulator accumulates a data volume output from the corresponding buffers according to the corresponding weighting, and outputs the accumulating signal according to the accumulated data volume. Each timer times waiting period after the corresponding buffer outputs the normal transmission request, and outputs a time-out transmission request when the waiting period exceeds a predetermined period. The arbiter receives the time-out transmission requests and the normal transmission requests, and selects one of the buffers from all of the time-out transmission requests and the normal transmission requests.

Another embodiment of the present invention provides a data transmission control method, the steps including: determining whether a plurality of buffers have data packets which want to be output; the plurality of accumulators respectively accumulate the data volume output from each buffer, and output an accumulating signal according to the accumulated data volume, each accumulator corresponding to one from among the plurality of buffers; each buffer outputs a normal transmission request according to an amount of tokens of a corresponding token bucket and the accumulating signal; a plurality of timers respectively time waiting period for each buffer after each buffer outputs the normal transmission request, and output a time-out transmission request when the waiting period exceeds a predetermined period, each timer corresponding to one from among the plurality of buffers; an arbiter receives the time-out transmission request and the normal transmission request; selects one of the buffers via the arbiter from all of the time-out transmission requests and the normal transmission requests; and the selected buffer outputs a data packet.

DETAILED DESCRIPTION OF INVENTION

Further areas to which the present systems and methods can be applied will become apparent from the detailed description provided herein. It should be understood that the detailed description and specific examples, while indicating exemplary embodiments of an I/O circuit and a data transmission control method, are intended for purposes of illustration only and are not intended to limit the scope of the invention.

Figure 1:
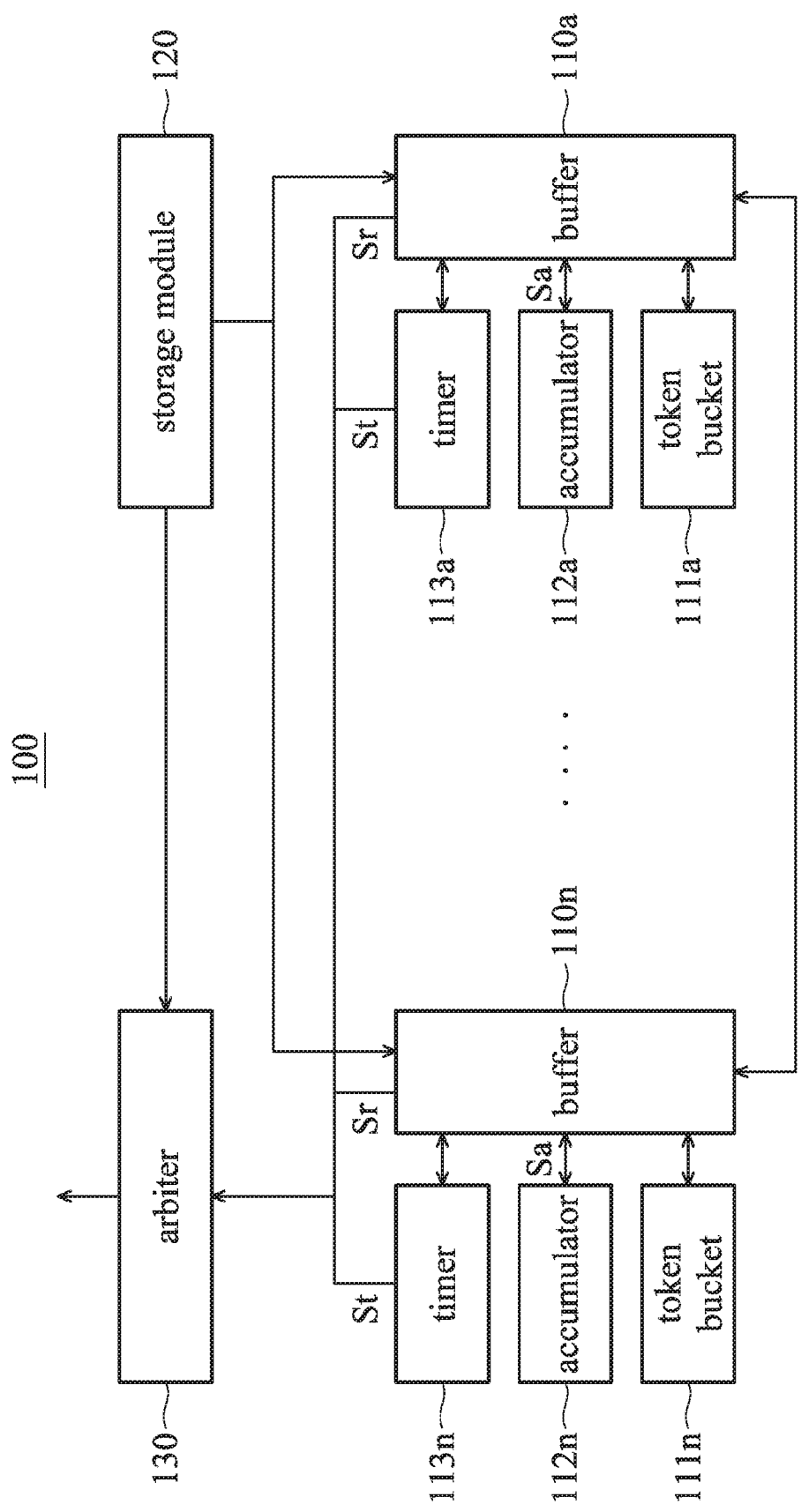
FIG. 1 is a schematic diagram of the I/O circuit in accordance with an embodiment of the invention.

FIG. 1 is a schematic diagram of the I/O circuit in accordance with an embodiment of the invention. As shown in FIG. 1, the I/O circuit 100 includes a plurality of buffers 110a-110n, a plurality of token buckets 111a-111n, a plurality of accumulators 112a-112n, a plurality of timers 113a-113n, a storage module 120, and an arbiter 130. Each buffer includes a token bucket, an accumulator, and a timer. Token buckets 111a-111n are configured to store the tokens. Each accumulator accumulates the data volume output from the corresponding buffer, and outputs the accumulating signals Sa according to the accumulated data volume. When buffers 110a-110n have data packets which need to be output, buffers 110a-110n output the normal transmission requests Sr according to the amount of tokens in token buckets 111a-111n and the accumulating signals Sa output from accumulators 112a-112n. Each timer times the waiting period after the corresponding buffer outputs the normal transmission request Sr. When the waiting period exceeds a predetermined period, timers 113a-113n respectively output the time-out transmission requests St. Storage module 120 stores a lookup table. Storage module 120 can be a Dynamic Random Access Memory. The lookup table includes a plurality of weightings corresponding to different types of data. Arbiter 130 receives the time-out transmission requests St and the normal transmission request Sr, and select one of buffers 110a-110n from all of the time-out transmission requests St and the normal transmission requests St. The selected buffer outputs the stored data packet. The I/O circuit can be a part of System-on-Chip (SoC), and arbiter 130 can connect to a processor, e.g. CPU, for transmitting the data packet to the processor.

According to an embodiment of the present invention, buffers 110a-110c respectively transmit the control command, the data packet, and the burst signal. For the processor, because the importance of the control command is higher than the importance of the data packet and the importance of the burst signal, the control command has the smallest weighting, such as 1. The importance of the data packet is the second highest, so the weighting of the data packet is greater than the weighting of the control command, e.g. 10. The importance of the burst signal is the lowest, so the weighting of the burst signal is the largest, e.g. 20. However, when buffers 110a-110c have data packets that want to be output, the first step is to determine whether the amount of tokens in the corresponding token buckets 111a-111c is enough. The required amount of tokens for transmitting the data packet is related to the type of data packet and the data volume, e.g. required amount of tokens=weighting*data volume.

For example, when buffer 110a wants to transmit a control command packet that the data volume is 10 units, buffer 110 first determines whether token bucket 111a has 10 tokens. When the amount of tokens in token bucket 111a is greater than or equal to 10, buffer 110a outputs the normal transmission request Sr to arbiter 130. After arbiter 130 receives the normal transmission request Sr of buffer 110a, arbiter 130 offers transmission priority to buffer 110a.

In addition, because the types of data that want to be transmitted and the data volume of the data packets are different, the sizes of token buckets 111a-111c of the corresponding buffers 110a-110c need to be different. For example, the required amount of tokens for transmitting one data packet by buffer 110a is 10, and the required amount of tokens for transmitting one data packet by buffer 110c is 100. Because the type of data packet transmitted by buffer 110a is more important, the size of token bucket 111a can be set to 100. Because the type of data packet transmitted by buffer 110c is less important, the size of the token bucket 111c can be set to 200. That means that when the token bucket is full of tokens, buffer 110a can transmit 10 data packets, and buffer 110c can only transmit 2 data packets. Making a comparison between buffer 110a and buffer 110c, the amount of transmissions from buffer 110a is greater than the amount of transmissions from buffer 110c. That means the chance for transmitting the data packet of buffer 110a is higher than buffer 110c. It should be noted that the size of the token bucket can be adjusted to control the chances of outputting the data packet, based on the needs of the user.

According to another embodiment of the present invention, the user can adjust the amount of supplemental tokens based on the importance of the data, the size of the packet, and the transmission resource occupancy status accumulated by this type of data. For example, token bucket 111a supplements 20 tokens every "n" seconds, and token bucket 111c supplements 50 tokens every "n" seconds. Because the amount of tokens will be reduced when the buffer transmits the data packet, the chances of transmitting the data packet can be indirectly controlled by appropriately controlling the amount of supplemental tokens after the amount of tokens is reduced.

According to an embodiment of the present invention, when arbiter 130 receives a plurality of normal transmission requests Sr at the same time, arbiter 130 selects one of the buffers according to the weightings corresponding to each normal transmission request Sr. For example, when arbiter 130 receives a normal transmission request Sr from buffer 110b and a normal transmission request Sr from buffer 110c at the same time, arbiter 130 offers transmission priority to buffer 110b for transmitting the data packet, because the importance of the data packet corresponding to buffer 110b is higher than the importance of the burst signal corresponding to buffer 110c.

According to another embodiment of the present invention, in order to prevent the buffer from waiting too long because the importance of the data packet is lower, the corresponding timers 113a-113c start to time the waiting period after buffers 110a-110c output the normal transmission requests Sr. When the buffer is not selected by arbiter 130 within a predetermined period, the buffer outputs a time-out transmission request St for reminding arbiter 130. After arbiter 130 receives the time-out transmission request St, arbiter 130 offers transmission priority to the corresponding buffer. It should be noted that the priority of the time-out transmission request St is higher than the priority of the normal transmission request Sr. For example, when arbiter 130 receives a time-out transmission request St and a normal transmission request Sr at the same time, even though the importance of the data packet corresponding to the time-out transmission request St is lower than the importance of the data packet corresponding to the normal transmission request Sr, arbiter 130 still offers transmission priority to the buffer corresponding to the time-out transmission request St.

According to another embodiment of the present invention, in order to avoid having arbiter 130 continuously offer transmission priority to a buffer that has higher data-packet importance, each buffer has an accumulator for accumulating the data volume of the transmitted data packet. When the accumulated data volume of one buffer is the largest, it means that this buffer has gotten most of transmission priority. Then the accumulator outputs an accumulating signal Sa for notifying the buffer to stop outputting the normal transmission Sr for conceding transmission priority to another buffer even if the buffer has a data packet that needs to be transmitted and the corresponding token bucket has enough tokens.

Figure 2:
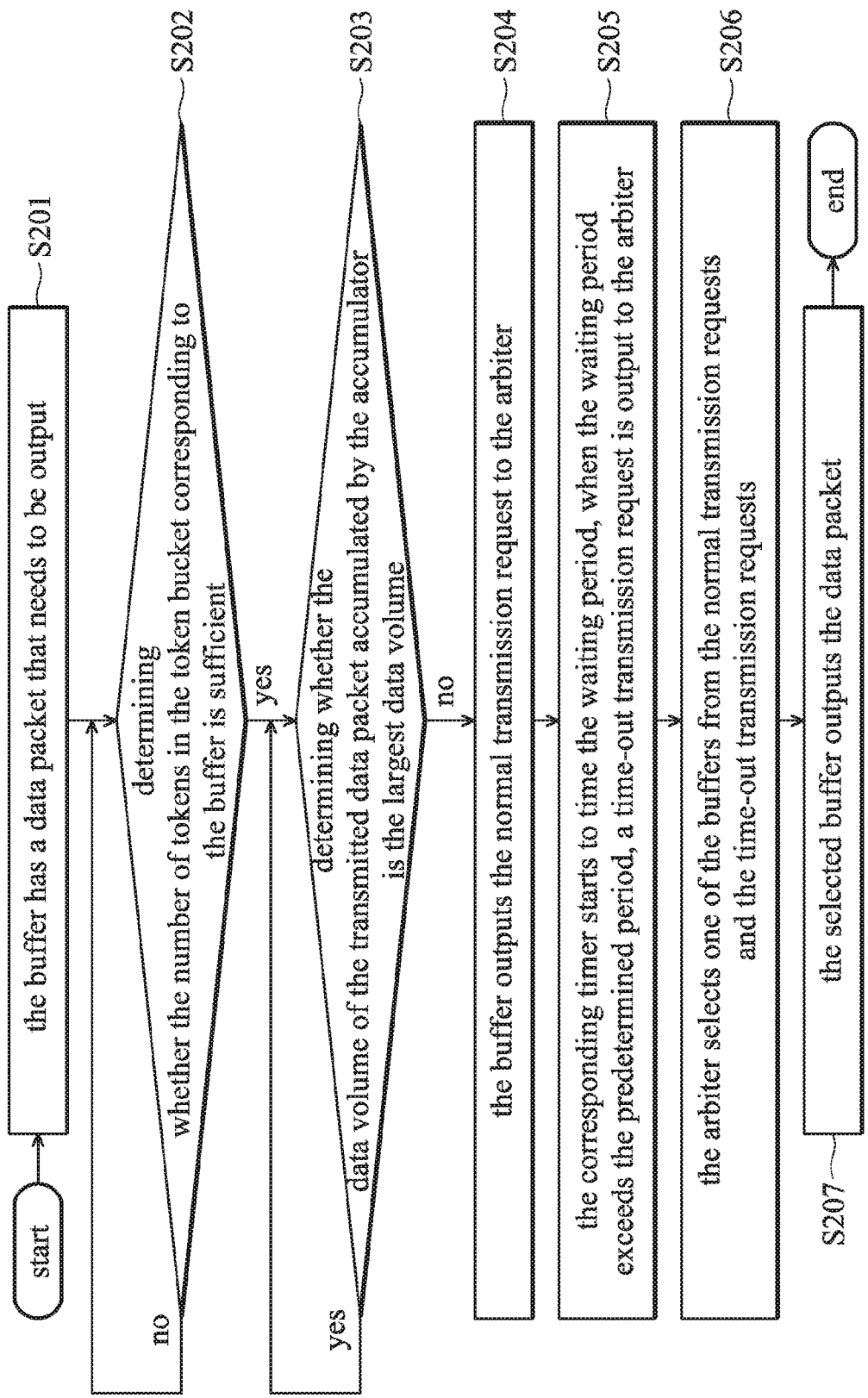
FIG. 2 is a flow chart of the data transmission control method in accordance with an embodiment of the invention.

Please refer to FIG. 2 with FIG. 1. FIG. 2 is a flow chart of the data transmission control method in accordance with an embodiment of the invention. In step S201, each buffer respectively determines whether there is a data packet that needs to be output. In step S202, when there is a data packet that needs to be output, a determination is made as to whether the amount of tokens in the token bucket corresponding to the buffer is greater than the required amount of tokens of the data packet. The required amount of tokens is related to the type of data packet and the data volume. In step S203, when the amount of tokens in the token bucket is sufficient, then a determination is made as to whether the data volume of the transmitted data packet accumulated by the accumulator is the largest data volume from all of the buffers. When this data volume is the largest one, then the buffer stops outputting the normal transmission request Sr and continuously repeats the determination until this data volume is not the largest data volume from all of the buffers. When the data volume is not the largest one, the method proceeds to step S204, the buffer outputs the normal transmission request Sr to arbiter 130, and the corresponding timer starts to time the waiting period. In step S205, a determination is made as to whether the waiting period exceeds a predetermined period. When the waiting period exceeds the predetermined period, a time-out transmission request St is transmitted to arbiter 130. In step S206, arbiter 130 selects one of the buffers from the normal transmission requests Sr and the time-out transmission requests St. In step S207, the selected buffer outputs the data packet.

As described above, the I/O circuit and the data transmission control method of the present invention determines the configuration of transmission priority according to the type of data packet that wants to be transmitted, the size of the data packet, and the waiting period. In this way, a situation wherein transmission priority is only offered to a buffer with the higher data-packet importance can be avoided. Furthermore, for a buffer that has lower data-packet importance, the arbiter can offer transmission priority to a buffer which has been waiting too long. That can improve the situation of the unfair configuration of the buffer for improving the processing efficiency of the computer system.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. An I/O circuit, adapted to a computer system, comprising:
    a plurality of buffers, each buffer has a token bucket, and each buffer outputs a normal transmission request when an amount of tokens in the token bucket is greater than or equal to a required amount of the tokens, wherein the required amount of the tokens is determined based on a weighting of data and data volume of a data packet of the data;
    a storage module, storing a lookup table, wherein the lookup table comprises a plurality of weightings respectively corresponding to different types of data;
    a plurality of accumulators, each accumulator corresponding to one from among the plurality of buffers, wherein each accumulator accumulates a data volume output from the corresponding buffers, and outputs an accumulating signal according to the accumulated data volume;
    a plurality of timers, each timer corresponding to one from among the plurality of buffers, wherein each timer times waiting period after the corresponding buffer outputs the normal transmission request, and outputs a time-out transmission request when the waiting period exceeds a predetermined period; and
    an arbiter, configured to receive the time-out transmission requests and the normal transmission requests, and select one of the buffers from all of the time-out transmission requests and the normal transmission requests to make the selected buffer outputs the data packet.

2. The I/O circuit as claimed in claim 1, wherein when the arbiter receives at least one time-out transmission request and at least one normal transmission request during transmission of the data packet, the arbiter selects the buffer corresponding to the time-out transmission request.

3. The I/O circuit as claimed in claim 1, wherein when the arbiter receives the plurality of normal transmission requests, the arbiter selects one of the buffers according to the weightings.

4. The I/O circuit as claimed in claim 1, wherein when the arbiter receives the plurality of time-out transmission requests, the arbiter selects one of the buffers according to the weightings.

5. The I/O circuit as claimed in claim 1, wherein each buffer further determines whether the data volume corresponding to the accumulating signal is the largest one, and when the amount of tokens in the token bucket is greater than the required amount of tokens, and the data volume corresponding to the accumulating signal is not the largest one, the buffer outputs the normal transmission request.

6. The I/O circuit as claimed in claim 1, wherein a respective size of each token bucket is determined according to the types of the data packets.

7. The I/O circuit as claimed in claim 1, wherein each token bucket is periodically supplemented with a predetermined amount of tokens within a predetermined period according to the types of the data packets.

8. A data transmission control method, comprising:
    determining whether a plurality of buffers have data packets which need to be output;
    a plurality of accumulators respectively accumulate a data volume output from each buffer, and output an accumulating signal according to the accumulated data volume, each accumulator corresponding to one from among the plurality of buffers;
    each buffer outputs a normal transmission request when an amount of tokens in the token bucket is greater than or equal to a required amount of the tokens;
    a plurality of timers respectively time waiting period for each buffer after each buffer outputs the normal transmission request, and outputting a time-out transmission request when the waiting period exceeds a predetermined period, each timer corresponding to one from among the plurality of buffers;
    an arbiter receives the time-out transmission request and the normal transmission request;
    the arbiter selects one of the buffers from all of the time-out transmission requests and the normal transmission requests; and
    the selected buffer outputs a data packet;
    wherein the required amount of the tokens is determined based on a weighting of data and data volume of the data packet of the data; and
    wherein the weightings are stored in a lookup table of a storage module and respectively corresponds to different types of data.

9. The method as claimed in claim 8, the step that the arbiter selects one of the buffers via the arbiter from all of the time-out transmission requests and the normal transmission requests further comprises:
    selecting the buffer corresponding to the time-out transmission request when the arbiter receives at least one time-out transmission request and at least one normal transmission request while the arbiter transmits the data packet.

10. The method as claimed in claim 8, the step that the arbiter selects one of the buffers via the arbiter from all of the time-out transmission requests and the normal transmission requests further comprises:
    selecting one of the buffers according to weightings corresponding to different types of data when the arbiter receives the plurality of normal transmission requests, wherein the weightings are stored in a lookup table of a storage module.

11. The method as claimed in claim 8, the step that the arbiter selects one of the buffers via the arbiter from all of the time-out transmission requests and the normal transmission requests further comprises:
    selecting one of the buffers according to weightings corresponding to different types of data when the arbiter receives the time-out transmission requests, wherein the weightings are stored in a lookup table of a storage module.

12. The method as claimed in claim 8, further comprising:
determining whether the data volume corresponding to the accumulating signal is the largest one; and
each buffer outputs the normal transmission request when the amount of tokens in the corresponding token bucket is greater than the required amount of tokens, and the data volume corresponding to the accumulating signal is not the largest one.

13. The method as claimed in claim 8, further comprising:
determining a respective size of each token bucket according to the types of the data packets.

14. The method as claimed in claim 8, further comprising:
periodically supplementing with a predetermined amount of tokens within a predetermined period to each token bucket according to the types of the data packets.

* * * * *